US008553945B2

(12) United States Patent
Zimmerman

(10) Patent No.: US 8,553,945 B2
(45) Date of Patent: *Oct. 8, 2013

(54) METHODS AND SYSTEMS FOR ANALYZING THE QUALITY OF DIGITAL SIGNATURE CONFIRMATION IMAGES

(75) Inventor: Robert S. Zimmerman, South Riding, VA (US)

(73) Assignee: The United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,879

(22) Filed: Sep. 14, 2012

(65) Prior Publication Data
US 2013/0011052 A1    Jan. 10, 2013

Related U.S. Application Data

(63) Continuation of application No. 13/445,245, filed on Apr. 12, 2012, which is a continuation of application No. 12/118,460, filed on May 9, 2008, now Pat. No. 8,170,291.

(51) Int. Cl.
G06K 9/00 (2006.01)

(52) U.S. Cl.
USPC .......................................... 382/112; 382/101

(58) Field of Classification Search
None
See application file for complete search history.

(56) References Cited

U.S. PATENT DOCUMENTS

| 4,916,640 | A | * | 4/1990 | Gasperi et al. | 382/291 |
|---|---|---|---|---|---|
| 5,033,097 | A | * | 7/1991 | Nakamura | 382/174 |
| 5,263,096 | A | * | 11/1993 | Yu et al. | 382/308 |
| 5,537,483 | A | * | 7/1996 | Stapleton et al. | 382/309 |
| 5,555,556 | A | * | 9/1996 | Ozaki | 382/173 |
| 5,600,732 | A | * | 2/1997 | Ott et al. | 382/112 |
| 5,647,027 | A | * | 7/1997 | Burges et al. | 382/275 |
| 5,682,250 | A | * | 10/1997 | Jefferson | 358/448 |
| 5,754,312 | A | * | 5/1998 | Fujimoto et al. | 358/2.1 |
| 5,825,924 | A | * | 10/1998 | Kobayashi | 382/219 |
| 5,832,140 | A | * | 11/1998 | Stapleton et al. | 382/298 |
| 5,889,885 | A | * | 3/1999 | Moed et al. | 382/172 |
| 5,898,800 | A | * | 4/1999 | Gahang | 382/270 |
| 5,992,753 | A | * | 11/1999 | Xu | 235/472.01 |
| 6,363,162 | B1 | | 3/2002 | Moed et al. | |
| 6,415,062 | B1 | * | 7/2002 | Moed et al. | 382/260 |
| 6,507,670 | B1 | * | 1/2003 | Moed | 382/172 |
| 6,757,081 | B1 | * | 6/2004 | Fan et al. | 358/474 |

(Continued)

OTHER PUBLICATIONS

International Search Report dated Aug. 20, 2008 for International Patent Application No. PCT/US/08/063315, filed May 9, 2008.

Primary Examiner — Wenpeng Chen
(74) Attorney, Agent, or Firm — Knobbe Martens Olson & Bear LLP

(57) ABSTRACT

Methods and systems for evaluating an imager that produces bi-chrome images from a scanner or a digital imaging device, the bi-chrome images having pixels of a first and second color. In one embodiment, a method for evaluating an imager includes generating an image that contains pixels of a first color and a second color. The image may be analyzed to determine information about particles of the first and second color. The particles may be described as contiguous pixels of the same color, and the particle information may relate to the size and quantity of the particles of each color. The method may further include determining if the image is unacceptable based on the particle information compared to predefined objective criteria.

23 Claims, 14 Drawing Sheets

(56) References Cited

U.S. PATENT DOCUMENTS

| | | | |
|---|---|---|---|
| 6,778,703 B1* | 8/2004 | Zlotnick | 382/218 |
| 6,807,286 B1* | 10/2004 | Krumm et al. | 382/103 |
| 6,973,204 B2 | 12/2005 | Adachi | |
| 7,016,536 B1* | 3/2006 | Ling et al. | 382/190 |
| 7,519,214 B2* | 4/2009 | Prakash et al. | 382/139 |
| 7,672,022 B1* | 3/2010 | Fan | 358/474 |
| 7,873,215 B2* | 1/2011 | Xiao et al. | 382/173 |
| 2002/0044689 A1* | 4/2002 | Roustaei et al. | 382/199 |
| 2002/0085116 A1* | 7/2002 | Kuwano et al. | 348/465 |
| 2003/0222142 A1* | 12/2003 | Stevens | 235/385 |
| 2004/0083134 A1* | 4/2004 | Spero et al. | 705/16 |
| 2004/0120578 A1* | 6/2004 | Grinchuk et al. | 382/199 |
| 2005/0180645 A1* | 8/2005 | Hasegawa et al. | 382/239 |
| 2005/0206890 A1* | 9/2005 | Hurst et al. | 356/239.7 |
| 2005/0247799 A1* | 11/2005 | Schenck et al. | 235/494 |
| 2006/0123051 A1* | 6/2006 | Hofman et al. | 707/104.1 |
| 2007/0285537 A1* | 12/2007 | Dwinell et al. | 348/263 |
| 2008/0063240 A1* | 3/2008 | Keng et al. | 382/112 |
| 2009/0196501 A1* | 8/2009 | Ma | 382/169 |
| 2012/0269401 A1* | 10/2012 | Zimmerman | 382/112 |

\* cited by examiner

Unacceptable IMD Image

Flatbed Scanner Image

Unacceptable

Acceptable

US 8,553,945 B2

METHODS AND SYSTEMS FOR ANALYZING THE QUALITY OF DIGITAL SIGNATURE CONFIRMATION IMAGES

CROSS-REFERENCE TO RELATED APPLICATIONS

This application is a continuation of U.S. application Ser. No. 13/445,245, filed on Apr. 12, 2012, which is a continuation of U.S. application Ser. No. 12/118,460, now U.S. Pat. No. 8,170,291, filed on May 9, 2008, both of which are hereby incorporated by reference in their entirety.

BACKGROUND

1. Field

The field of the invention relates to analyzing the quality of an image and, more specifically, to evaluating the quality of a digital bi-chrome signature confirmation image.

2. Background

Delivery services, including commercial package delivery services, the United States Postal Service, and couriers, often receive a recipient's signature as confirmation that a package, letter or another deliverable item was successfully delivered. The confirmation signature is typically saved by the delivery service. Subsequently, the confirmation signature can be used to verify the package was delivered and identify who accepted the package. In some delivery services, a confirmation signature is entered into a delivery tracking system using a stylus and a signature pad. In other delivery services, the recipient signs a piece of paper to confirm the delivery, and the recipients' handwritten confirmation signature is then digitally imaged or scanned and electronically stored in a delivery tracking system.

The quality of a confirmation signature image can be affected by many factors. Certain image aberrations can make the stored image inadequate for identifying the recipient. For example, movement of the imaging device, sunlight, shadows, and/or a tilted imaging angle can adversely affect the resulting confirmation signature image. Image processing techniques can be used to enhance the quality of a confirmation signature image after it is stored. However, a real-time evaluation of the confirmation signature image to determine if the image is acceptable may obviate the need for subsequent processing. Also, it can be difficult to evaluate how well any one certain technique will work for a large set of confirmation signature images (for example, 1000+ images), which again indicates the need for evaluating a confirmation signature image before it is stored. Also, determining how a software upgrade affects the quality of an imaged signature for a large set of images can be difficult. Typically, the images are evaluated by a user viewing the images. Such an evaluation is quite burdensome and subjective.

Accordingly, implementing a real-time confirmation signature evaluation process that rejects poor images when a signature is first imaged would be advantageous. In addition, methods for validating a new image process (e.g., a software or hardware upgrade) that produces an image of a confirmation signature would be useful to address the above-described problems and other problems in the art.

SUMMARY OF CERTAIN EMBODIMENTS

The system, method, and devices of the invention each have several aspects, no single one of which is solely responsible for its desirable attributes. Without limiting the scope of this disclosure, its more prominent features will now be discussed briefly. After considering this discussion, and particularly after reading the section entitled "Detailed Description of Certain Embodiments" one will better understand the inventive features and aspects of these embodiments.

The features of the embodiments described herein can be used advantageously in many ways. Some embodiments can be used for rejecting poor quality images at the time the signatures are scanned to ensure sufficiently high quality data is input into a tracking system. Also, some embodiments validate an imaging process at a point in time after a confirmation signature image has been input into a tracking system. In addition, some embodiments can validate an imaging process different hardware and software releases used to generate a confirmation signature image, thereby determining if the new release is acceptable as a replacement for the currently used hardware or software.

In some embodiments, a method of evaluating a bi-chrome digital image generated by an imaging device includes generating an image with a hand-held imaging device, the image having pixels of a first color and a second color, determining information about particles of the first and second color contained in the image, each particle comprising contiguous pixels of the same color, the particle information comprising information on first and second color particle size and count, and determining if the image is unacceptable based on predetermined objective criteria and the particle information. The first color can be black and the second color can be white. In some aspects, the particle information includes the area of the image covered by small first color particles, the number of small first color particles, the number of small second color particles in the image, the area of the image covered by first color particles, the area of a selected region in the image covered by non-small first color particles, the area of the image covered by large first color particles, the number of non-small first color particles in the selected region, the number of first color particles having a first defined range of sizes, the average size of the first color particles having a first defined range of sizes, and the area of the image covered by the first color particles having a first defined range of sizes. For confirmation signatures, the selected region may be a signature portion.

According to another aspect of the first embodiment, the small first color particles comprise particles of the first color having a number of pixels that is less than about a first threshold value, the large first color particles comprise particles of the first color having a number of pixels greater than about a second threshold value, the small second color particles comprise particles of the second color having a number of pixels less than about a third threshold value, and the non-small first color particles comprise particles having a number of pixels within a defined range, the range comprising between about a fourth threshold value and about a fifth threshold value. In another aspect, the image is unacceptable if any of the objective criteria is met, the objective criteria comprising (a) the (total number of pixels) of the image covered by small first color particles is greater than about a sixth threshold value and the number of small first color particles is greater than about a seventh threshold value, (b) the number of small second color particles is greater than about an eighth threshold value, (c) the percentage of the area of the image covered by non-small first color particles is less than about a ninth threshold value, (d) the percentage of the area of the image covered by non-small first color particles is greater than about a tenth threshold value, (e) the percentage of the area of a selected region in the image covered by non-small first color particles is less than about an eleventh threshold value, (f) the total area (total number of pixels) of the image covered by of large first color particles in the image is greater than about a twelfth threshold value and the number of non-small first color particles in the selected area is greater than about a thirteenth threshold value, (g) the number of first color particles having a defined range of sizes is greater than about a fourteenth threshold value and first color particles having a defined range of sizes has an average pixel size about a fifteenth threshold value, (h) the total area of the image covered by first color particles having a defined range of sizes is greater than about a sixteenth threshold value, and (i) the percentage of the area in a selected region in the image covered by non-small first color particles is greater than about a seventeenth threshold value.

In some embodiments, and in reference to the above-stated threshold values, the first threshold value is about 20; the second threshold value is about 30,000; the third threshold value is about 20; the fourth threshold value is about 21; the fifth threshold value is about 200; the sixth threshold value is about 2500; the seventh threshold value is about 500; the eighth threshold value is about 175; the ninth threshold value is about 7%; the tenth threshold value is about 35%; the eleventh threshold value is about 5.3%; the twelfth threshold value is about 45000; the thirteenth threshold value is about 15; the fourteenth threshold value is about 55; the fifteenth threshold value is about 65; the sixteenth threshold value is about 5000; and the seventeenth threshold is about 35%.

Another embodiment includes a machine readable medium comprising instructions for evaluating a bi-chrome image produced by an imager, the bi-chrome images having pixels of a first and second color, wherein the instructions upon execution cause a machine to generate an image with an imaging device, the image having pixels of a first color and a second color, determine information about particles of the first and second color contained in the image, each particle comprising contiguous pixels of the same color, the particle information comprising information on first and second color particle size and count, and determine if the image is unacceptable based on predetermined objective criteria and the particle information. In one aspect, the particle information includes the area of the image (or total number of pixels) covered by small first color particles, the number of small first color particles, number of small second color particles in the image, the area of the image covered by non-small first color particles, the area of a selected region in the image covered by non-small first color particles, the area of the image covered by large first color particles, the number of non-small first color particles in the selected region, the number of first color particles having a first defined range of sizes, the average size of the first color particles having a first defined range of sizes, and the area of the image covered by the first color particles having a first defined range of sizes.

Another embodiment includes a system for generating and evaluating bi-chrome digital images includes an imaging device configured to capture a digital bi-chrome image, the image having particles of a first color and particles of a second color, each particle comprising contiguous pixels of the same color, a processor configured to analyze at least a portion of the bi-chrome image and determine information about the particles of the first and second color, the particle information comprising information on first and second color particle size and count, and further configured to determine if the image is unacceptable in real-time or near real-time based on predetermined objective criteria and the determined particle information. Typically, the first color is black and the second color is white. In some embodiments, the first color is white and the second color is black. Other colors may also be considered the first color and second color as well. The particle information for the analyzed portion of the image may include the area covered by small first color particles, the number of small first color particles, number of small second color particles in the image, the area covered by non-small first color particles, the area of a selected region in the analyzed portion of the image covered by non-small first color particles, the area of the analyzed image covered by large first color particles, the number of non-small first color particles in the selected region, the number of first color particles having a first defined range of sizes, the average size of the first color particles having a first defined range of sizes, and the area of the analyzed portion of the image covered by the first color particles having a first defined range of sizes.

Another embodiment includes a method of evaluating an imaging configuration that produces digital bi-chrome images using a control process, the test imaging configuration having test hardware and/or test software elements, comprises processing a plurality of bi-chrome test images with a test imaging configuration to form a plurality of resulting bi-chrome test images, analyzing the plurality of resulting test images to determine information about pixel particles of a first color and second color contained in each of the resulting test images, each particle having contiguous pixels of the same color, the determined particle information comprising, for each resulting test image, size information of first color particles and second color particles in the image and quantity information of the number of first color particles and second color particles in each image determining the number of resulting test images that are unacceptable based on predetermined objective criteria and the particle information, processing the plurality of test images with a control imaging configuration to form a plurality of resulting control images, analyzing the plurality of resulting control images to determine information about pixel particles of a first color and second color contained in each of the resulting control images, each particle having contiguous pixels of the same color, the determined particle information comprising, for each resulting control image, size information of first color particles and second color particles in the image and quantity information of the number of first color particles and second color particles in each image, determining the number of resulting control images that are unacceptable based on predetermined objective criteria and the particle information, and comparing the number of unacceptable resulting control images and unacceptable resulting test images to determine if the test imaging configuration is acceptable.

DETAILED DESCRIPTION OF CERTAIN EMBODIMENTS

Figure 1:
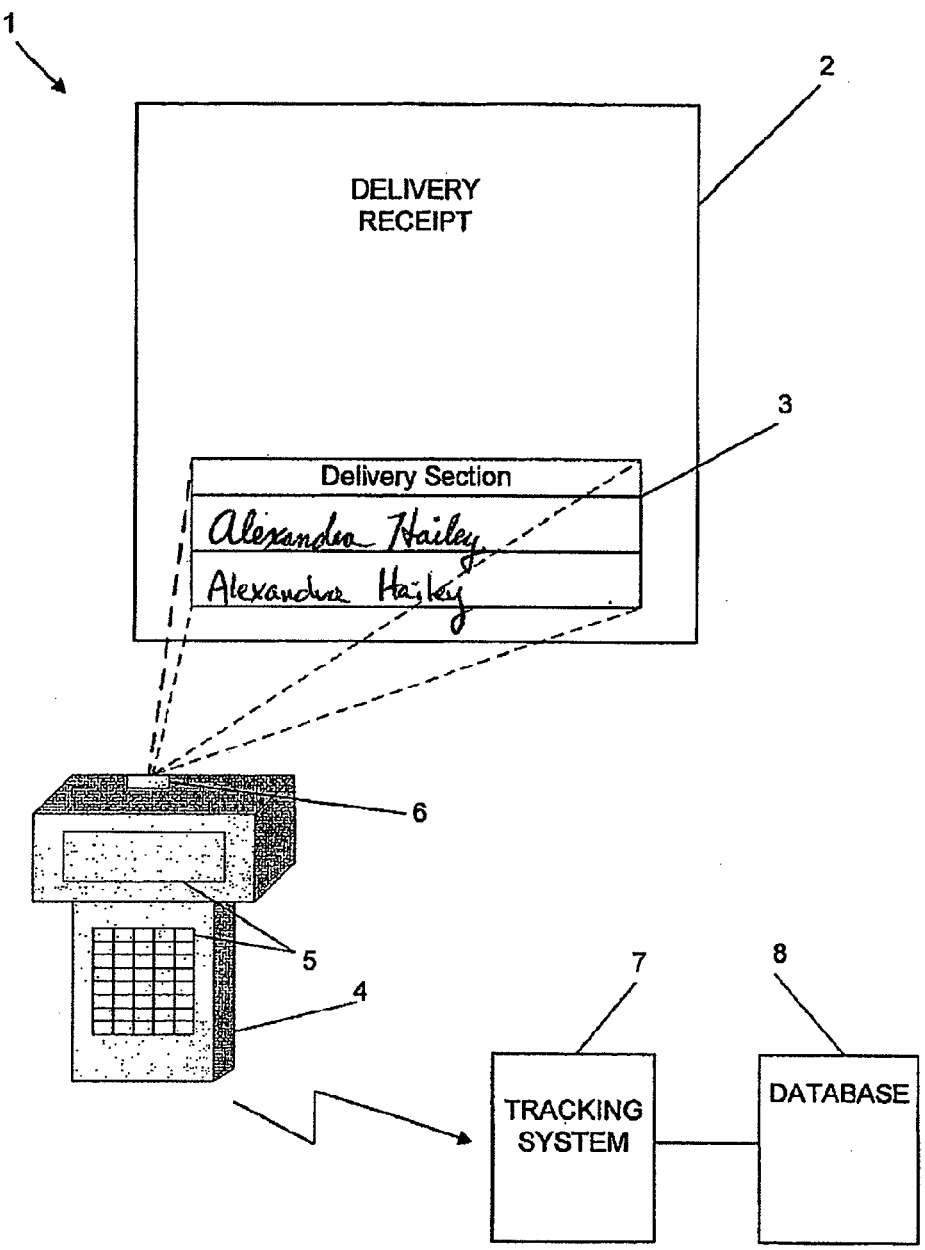
FIG. 1 is a schematic illustrating a confirmation signature imaging system.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Millions of confirmation signatures are digitally recorded. However, to properly document that a package was successfully delivered and identify the recipient, the resulting image must be legible. Some embodiments of the development can be used to determine whether a confirmation signature image is "acceptable" or "unacceptable" when the image is generated. This allows another confirmation signature image to be generated immediately if the first image is unacceptable, and obviates verification problems arising from storing an image that can not be used to identify the signed recipient.

Some embodiments, described hereinbelow, determine information relating to groups of contiguous pixels or "particles" in a confirmation signature image, and can evaluate the information against certain objective criteria to determine the acceptability of the image. Such embodiments can similarly be used to evaluate bi-chrome images other than confirmation signature images, and also similarly in color images where a particle can be defined to comprise pixels of a single color or range of colors.

The quality of a digital image is due at least in part to the hardware and software comprising the image system that is used to generate the digital image. For example, the quality of a digital image can be affected by the imaging sensor and the software that processes the data generated by the sensor. Handheld imaging systems may be tasked to produce acceptable images under a variety of lighting conditions. Accordingly, data relating to the number of acceptable and/or unacceptable images produced by an imaging system under varied conditions can provide information that relates to the performance of the imaging system. In this determination, each image can be analyzed for particular characteristics, and then predetermined objective criteria can be used to evaluate the characteristics and determine if the quality of each image is acceptable.

Some embodiments can be used for analyzing the quality of United States Postal Service hand-written digital signature confirmation images. Images of confirmation signatures can be produced by a handheld scanner such as, for example, an Intelligent Mail Device ("IMD") scanner used by U.S. Postal workers in the field. Typically, the size of a signature confirmation image generated by the IMD is 282,112 pixels (928 pixels×304 pixels). Different size image and images other than signature confirmation images can also be evaluated by the embodiments described herein. Some examples herein describe area coverage of an image, referring to the 282,112 pixel image produced by the IMD. Of course, equivalent area coverage can be determined for other size images, and the images can be evaluated using this determined area coverage. Such equivalent area coverage may be expressed in pixels, or as an equivalent percentage of the image.

Some embodiments can be used to test new imaging configurations. For example, an imaging system with a first configuration of imaging hardware and/or software can be used to produce a first set of images. Then, an imaging system having a different configuration of hardware and/or software can be used to produce a second set of images. For example, the "different" configuration may be a hardware or software "upgrade" that requires validation before it is installed system-wide. Identical objective criteria can be used to evaluate the first and second set of images to determine which images are "acceptable" for each configuration. Image particle analysis techniques are used to determine information about particles in an image, e.g., particle counts, average size particles of a certain color, and total area coverage or fractional area coverage (e.g., percentage) of a certain color pixel particle. Other criteria of the image such as "skew" can also be determined. Evaluation of this information can then be used to determine an image's acceptability. Comparing the number of "acceptable" (or "unacceptable") images in the first and second sets of images can help determine if a new hardware or software configuration is an improvement over the existing configuration.

Some imaging systems produce bi-chrome or two-color images. For example, the IMD produces bi-chrome images. In such cases, objective criteria relating to the number of black or white "particles" in the image is used to evaluate the images. "Particle" as used herein is a broad term that refers to a group of two or more contiguous pixels of the same color (for example, black or white). Particles may be generally referred to herein as being small, medium, or large in size, generally referring to the number of contiguous pixels (of the same color) in the particle. A particle can also be referred to as "non-small" which indicates the particle may be larger than a small particle. Similarly, a particle can be referred to as "non-large" which indicates the particle is smaller than a large particle. In some embodiments, a "small" particle can comprise less than about twenty (20) pixels. In some embodiments, a "large particle" can comprise greater than about 10,000, 20,000, or about 30,000 pixels. Embodiments described herein include examples of the particle size used in certain objective criteria for image evaluation. For example, particle size may be used as a threshold value when determining the number of particles of a particular size (e.g., small, medium, or large), sometimes referred to as the particle "count." Particle size may also be used to identify a certain set of particles, and the area of the image that is covered by the particles in the set may be used to evaluate whether the image is acceptable.

FIG. 1 is a schematic diagram showing an example of an imaging system 1 that can benefit from using image quality evaluation methods described herein. This imaging system 1 illustrates an imaging system for capturing confirmation signature images. Such imaging systems can be used by commercial package delivery companies, the United States Postal Service, intra-company delivery services, and other organizations that typically require a signature confirmation 3 in a designated area portion of a delivery receipt 2, for example, on a delivered package or on a document associated with a package or other item. The signature confirmation in FIG. 1 includes a recipient's signature and printed name. The portion of the image that depicts the confirmation signature is referred to herein as an "area of interest" to differentiate it from the rest of the image. Package, as used herein, is a broad term that generally refers to anything that can be delivered, including but not limited to, a letter, package, parcel, product, or good). The development can also be used for any signature image of a confirmation receipt, for example, for a payment or a service.

An imaging device 4 is used to capture an image of the recipient's signature. For delivery services the imaging device 4 may be handheld. The imaging device 4 includes an optical component 6 which is illustrated, in dashed lines, as disposed on the side of the imaging device 4 that faces into the page. The optical component 6 receives light and captures a digital image of all or part of the delivery receipt including the confirmation signature. Although the image can be color, typically it is black-and-white (or bi-chrome) to save on storage space and facilitate faster transmission. In some embodiments the optical component 6 includes a CCD (charge-coupled device) image sensor or a CMOS (complimentary metal-oxide semiconductor) image sensor. The imaging device 4 can also include a user interface 5 that allows a user to operate the imaging device 4. The imaging device 4 can be built specifically for capturing confirmation signatures and can include other functionality as well. The user interface can be used to input information relating to a delivery ("delivery information") to the imaging device and can be associated with the imaged confirmation signature. One example of a suitable imaging device is the Intelligent Mail Device scanner currently used by the United States Postal Service. In other embodiments, suitable imaging functionality can be included in multi-purpose devices including portable telecommunication devices (mobile phones, cell phones, digital cameras) and other portable devices.

FIG. 1 also illustrates a tracking system 7 that is configured to receive delivery data, including the delivery information and confirmation signature images from the imaging device 4. The delivery data is sent to the tracking system 7 through a (wired or wireless) communication network. The delivery data can be sent immediately, or in near real-time, or it can be downloaded and provided to the tracking system 7 at a later time, for example, at the end of a delivery run. The tracking system 7 stores the delivery data in a database 8. The database 8 may be a structured query language (SQL) relational database residing within the tracking system 7. The database 8 may implement T-SQL, PL/SQL, Sqsh, SQL, SQL/PSM, SQL PL, MySQL, PL/pgSQL, or other alternative structured query language standards. As one of skill in the art will appreciate, other types of databases and other schemes of data storage may also be used.

In some embodiments, the tracking system 7 illustrated in FIG. 1 can receive and track delivery data from numerous imaging devices. The quality of confirmation signature images captured by the imaging device or stored in the tracking system 7/database 8 can be analyzed using predetermined objective criteria, discussed hereinbelow, to determine whether the images are acceptable. Information on the number of acceptable images, and specific image characteristics of the acceptable and unacceptable images, can be used to evaluate the quality of the imaging hardware and software that is used to generate the confirmation signature images. This information can be especially valuable when testing software (or hardware) upgrades to see if in fact the "upgrade" performs better than its predecessor. The objective criteria can also be used to ensure acceptable images are captured by the imaging device 4 before the images are stored to a tracking system. In some embodiments, the images are evaluated on the imaging device 4 and the operator is alerted as to the quality of the image, thus allowing another image to be generated, if necessary.

Figure 2:
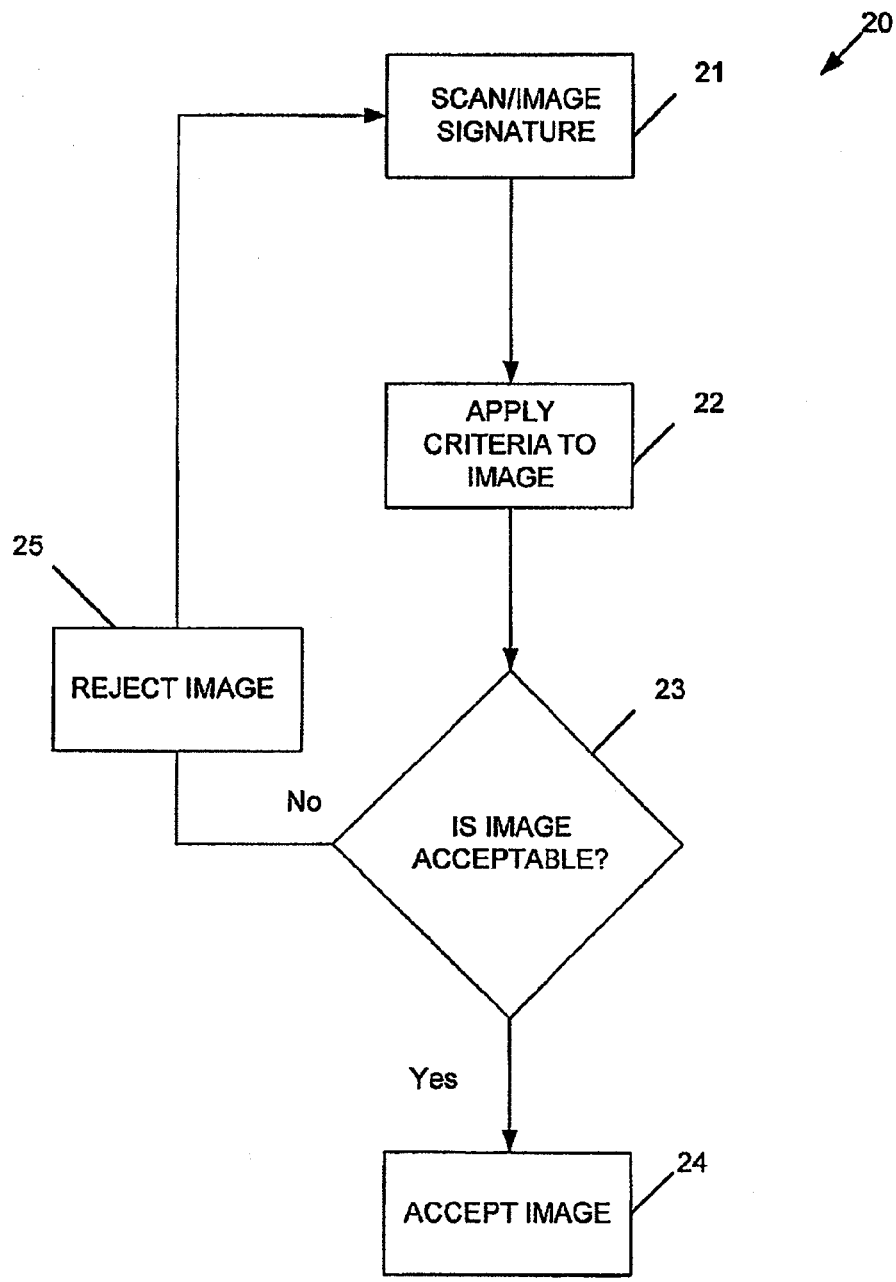
FIG. 2 is a flowchart illustrating a process for determining the quality of an image.

FIG. 2 is a flowchart illustrating a process 20 for determining the quality of an image or sets of images. Embodiments of processes that include particular objective criteria for evaluating image quality are discussed herein below in reference to FIGS. 3-27. At step 21 of process 20, images are generated by imaging or scanning data, for example, delivery confirmation signatures. Imaging device 4 (FIG. 1) or another imaging device can be used to generate the image. At step 22, the image is analyzed, and information needed to evaluate objective criteria is determined for each image, and the objective criteria is calculated for each image.

For example, objective criteria relating to determining if there is too much black pixel noise in the image may use information of the number of small black pixel particles in the image, and also the total area covered by the small black pixel particles (e.g., percentage of the image or area of interest). At step 23, the criteria is evaluated to determine if the image is acceptable. For example, this can include evaluating the number of small black pixel particles and the total area of small black pixel particles relative to threshold values to determine if the image is acceptable. If the image satisfies the objective criteria, it is deemed acceptable at step 24. If not, the image is rejected at step 25. Process 20 can then be repeated to evaluate each image or each image in a set of images. Acceptable images may then be stored or further processed. When process 20 is used on a portable imaging device, the process can provide real-time feedback to the operator indicating whether an image is accepted or rejected, allowing another image to be made for rejected images.

In another example, the amount of skew of the generated image is used to determine whether of not the image is acceptable. Skew, as used herein, refers to the angle between a vertical or horizontal axis of the scanning device and a corresponding vertical or horizontal axis in the image. Typical acceptable skew values may be up to about ten degrees. In a preferred embodiment, a skew value above which an image is deemed unacceptable is about plus or minus seven degrees. In some embodiments, a feature in the image that has a known rectangular shape is evaluated to see if it appears rectangular in the image. If it is not a rectangle in the image, the imaging system may be able to manipulate the image so that the feature appears as a rectangle. If the feature cannot be adequately restored to a rectangular shape, the image may be deemed "unacceptable" and rejected. In some examples, the feature is a barcode. When used, skew is typically combined with one or more other criteria to determine if an image is acceptable. In some embodiments, the imaging system also compensates for image aberrations of pitch, roll, and yaw.

Figure 3:
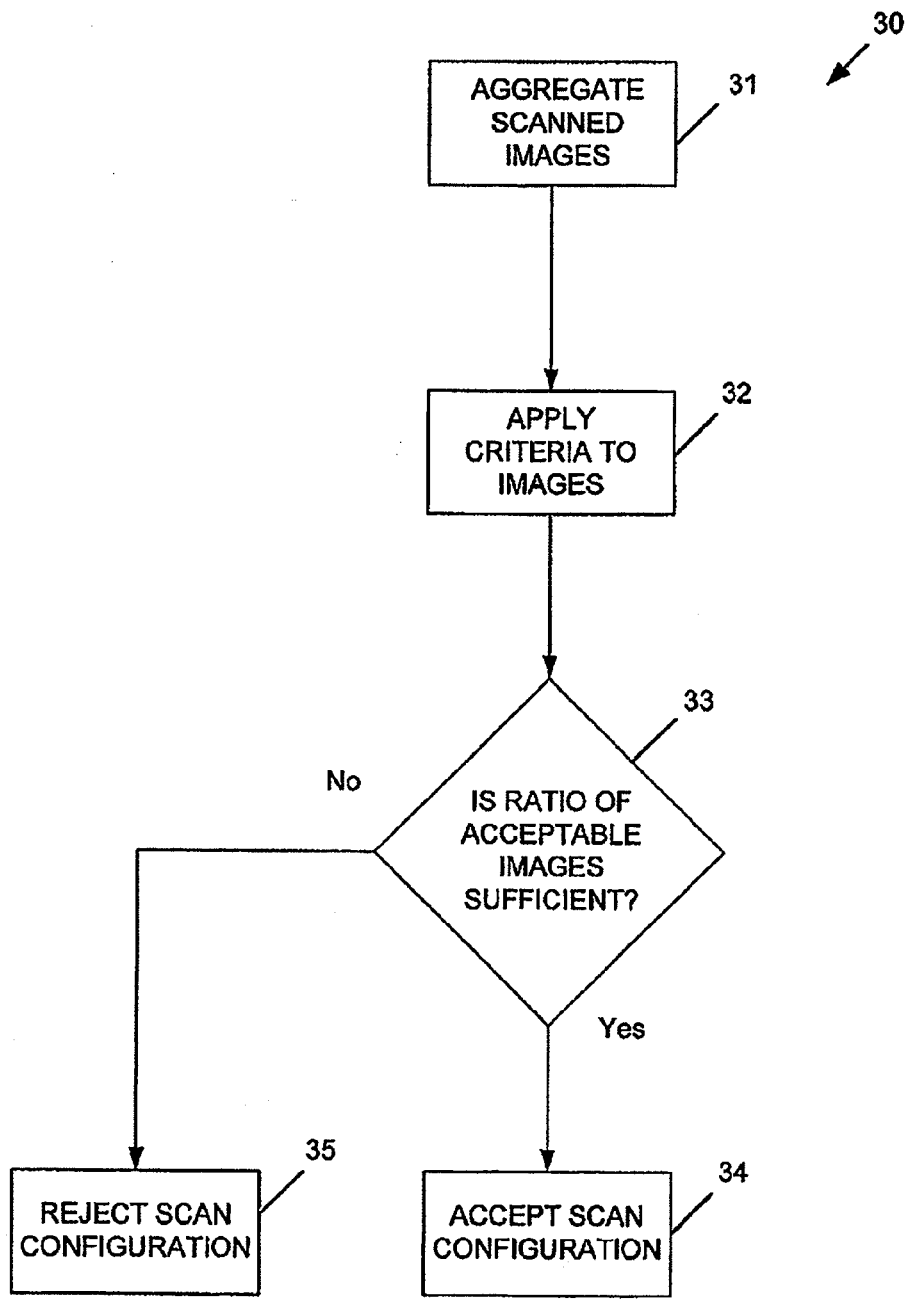
FIG. 3 is a flowchart illustrating a process for determining if an imaging configuration is acceptable.

FIG. 3 is a flowchart illustrating a process 30 for determining if an imaging configuration is acceptable. One example of when this process can be used is when a new version of imaging software is delivered to the user entity. Before the new software is placed on all of the entities' imaging devices, a test can be done to determine if "upgrading" to the new software provides a performance improvement that is worth the resources it takes to accomplish the upgrade, and to check to see if the new software even works under a variety of imaging conditions. At step 31, a plurality of images are scanned or obtained (from previously scanned and stored images). At step 32, objective criteria is applied to each of the images to determine if each image in the set of images is acceptable. At step 33, the ratio of acceptable images verses the total number of images is evaluated to determine if the ratio is sufficient, for example, if it is above a predetermined threshold value. The threshold value can be based on a previous evaluation of the same images using a different software configuration. For example, the prior (or current) software configuration can be used to determine which of the images are acceptable or rejected. In some embodiments, the ratio of acceptable images relates to the ratio of acceptable to unacceptable images (or vice-versa). If the threshold value or ratio is sufficient, at step 34 the new scan configuration is accepted. If not, the scan configuration is rejected at step 35.

Image Particle Evaluation

It has been found that evaluating images based on certain particle analysis criteria allows differentiation between "acceptable" and "unacceptable" images that are used for signature confirmation. Examples of the objective criteria described herein relate directly to whether particles of a particular size are found, or not found, in images generated by an IMD. However, they also relate more generally to any bi-chrome image generated using other imaging devices. Bi-chrome or two color images can be black and white, or any other two colors. References hereon to a pixel or particle of a "first color" and/or a "second color" refer to one of the two colors of a bi-chrome image. For example, the first color can be black and the second color can be white. Similar techniques can also be used for color images.

The size of the particle refers to the area covered by its contiguous pixels of a particular color, for example, in square pixels. The size of the particles can be equivalently described by referring to the number of pixels in a particle or the area covered by the pixels. The criteria can relate to black particles and/or white particles. The terms small, medium, and large are broad terms that generally refer to particles having pixel counts of less than about 20 pixels (small), between about 20 and about 200-600 pixels (medium), and larger than about 10,000-30,000 pixels (large). It has been found that pixels in these size ranges are typically the most relevant for two-color image evaluation. In some embodiments, medium-sized particles can include all particle sizes between small particles and large particles. It is appreciated that differences in evaluation criteria of one or several pixels may not affect the evaluation, and that the actual criteria best used may differ based on the types of images analyzed. Analyzing bi-chrome images using analysis methods that include one or more of the particle evaluation criteria is advantageous over typical image evaluation techniques. The methods facilitate quick, objective evaluation of numerous images, and allow different image generation configurations to be compared in a statistically significant manner. The same (or similar) criteria described for IMD images can be used for analyzing images in other imaging applications and on images created by other digital imaging or scanning devices.

Examples of processes and criteria for evaluating the quality of bi-chrome images are described under the headings "Black Pixel Noise," "White Pixel Noise," Too Few Black Pixels," "High Number of Black Pixels," "Test Image/Control Image Comparison," "Large Black Particle Aberrations," and "Medium Black Particles" herein below. Some examples of criteria can include, but are not limited to, the amount of black pixel noise in the entire IMD image (for example, particles less than about 20 pixels), the amount of white pixel noise in the entire IMD image (for example, particles less than about 20 pixels), and/or the number of black pixel particles in the entire IMD image (for example, particles greater than about 20 pixels). "Noise" in an image generally refers to unwanted high frequency aberrations of one color within an area of a second color. For example, black pixels speckled throughout a white background. Other criteria can include the number of black pixel particles in a certain IMD image area of interest (for example, particles greater than about 20 pixels), the amount of black pixel particles in the IMD image area of interest as compared to a corresponding image area in an image generated by a flatbed scanned image (for example, particles greater than about 20 pixels), the amount of black pixel particles in the entire IMD image (for example, where particles greater than about 30,000 pixels), and/or the number or coverage of medium black pixel particles in the entire IMD image (for example, where the particles are medium-sized, for example between about 20-200 pixels).

Such criteria can be used in combination or singly or as separate criterion in different embodiments. Specific values, for example, about 30,000 pixels, can be used as threshold values in the applying criteria. It is appreciated that other threshold values from the specific values disclosed herein may also be used for effective image evaluation. In some cases, the threshold values may be determined in part by the particular technical application in which they are used. Certain criteria is described individually in detail below, and may be used with any of the processes described herein to assess image quality. Typically the threshold values are predetermined. However, in some embodiments the threshold values can be dynamically determined, based either on a user input or a predetermined image analysis strategy and real-time data.

Evaluating and analyzing the confirmation signature images need not be performed only on the imaging device or computers of the tracking system 7. In some embodiments the images are moved from the tracking system 7 to another computer system suitably configured to execute the image quality evaluation software. For example a server system, or a standalone computer including a desktop or notebook computer, can be used to execute the image quality evaluation software.

Black Pixel Noise

Figure 4:
FIG. 4 is an illustration of an unacceptable image due to noise in the image which is manifested as small black particles, each particle formed by a number of contiguous black pixels.
Figure 5:
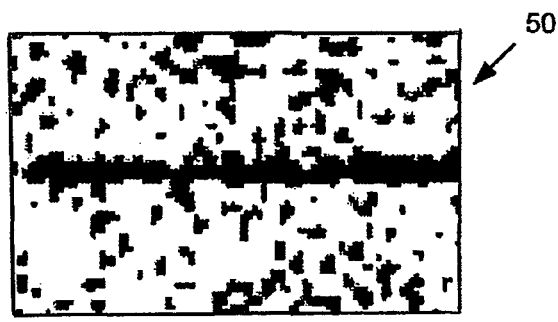
FIG. 5 is a portion of the image in FIG. 4 illustrating an example of black pixel noise.
Figure 6:
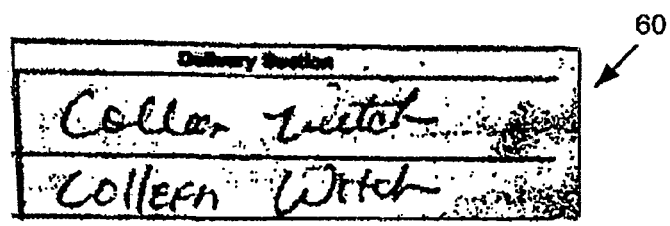
FIG. 6 is an image that illustrates an acceptable amount of black pixel noise.

In one example, an image is evaluated to determine the amount of black pixel noise in the image. FIG. 4 is an illustration of an unacceptable image 40 due to excessive black pixel noise manifested in small black particles. FIG. 5 illustrates an example of a close-up view of black pixel noise 50 showing the numerous small black pixel particles. FIG. 6 illustrates an image 60 that exhibits a small amount of black pixel noise that may result in the image 60 being deemed "acceptable" based on selected threshold values. In one embodiment, an image is analyzed to determine the number of black particles in the image that are less than a certain size (as determined by the number of contiguous pixels in the particle). In some examples, the particle size is between about 10 and about 30 pixels, preferably between about 15 and about 25 pixels, and in some examples is about 20 pixels.

Figure 7:
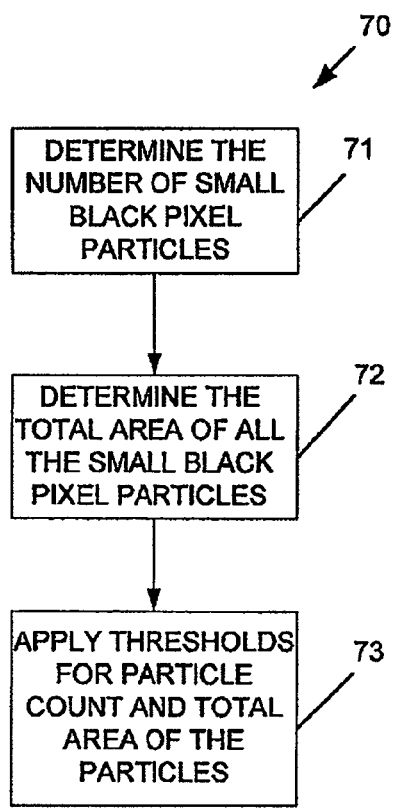
FIG. 7 is a flowchart illustrating a process for determining images with unacceptable or acceptable amounts of black pixel noise.

FIG. 7 is a flowchart illustrating a process 70 for determining whether an image has an unacceptable or acceptable amount of black pixel noise in an image generated by an IMD. Process 70, and the processes illustrated in FIGS. 11, 14, 17, 20, 24 and 27, can be used to determine if the images are acceptable in step 23 of the flowchart shown in FIG. 2. At step 71, process 70 determines the number of small black pixel particles in the image. In one example, each small black pixel particles is defined to be a set of contiguous pixels such that each particle is comprised of less than about 20 black pixels. In some embodiments, the threshold value for the number of particles is between about 250 and about 750 particles, more preferably between about 450 and about 550 particles. In some embodiments, the particle count threshold value is about 500. At step 72, process 70 determines the total area of all the small black pixel particles. The total area is the cumulative area covered by black pixels in all of the small black pixel particles. Accordingly, typically the total area equals the total number of black pixels in all the small black pixel particles. Threshold values to evaluate the area covered by small black pixel particles and the pixel count are predetermined or dynamically calculated. These values can be influenced by the image size because larger images will have a larger number of small black pixel particles. In some embodiments, the threshold value for the total area of black pixels in all the particles is between about 2,000 and 3,000 pixels, and more preferably between about 2,400 and 2,600 pixels. In some embodiments, the total area threshold value is set to about 2,500 pixels. At step 73, the acceptability of the image is determined by comparing the threshold values for the black pixel particle count and the total black pixel particle area to the actual values determined for this criteria. In one example, the image is deemed "unacceptable" if the total black pixel count (or area of noise) in the image exceeds the threshold value of about 2,500 pixels and the small black particle count exceeds the threshold value of about 500.

White Pixel Noise

Figure 8:
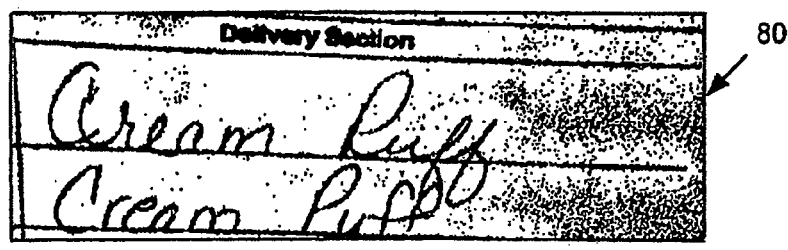
FIG. 8 is an illustration of an unacceptable image due to white pixel noise.
Figure 9:
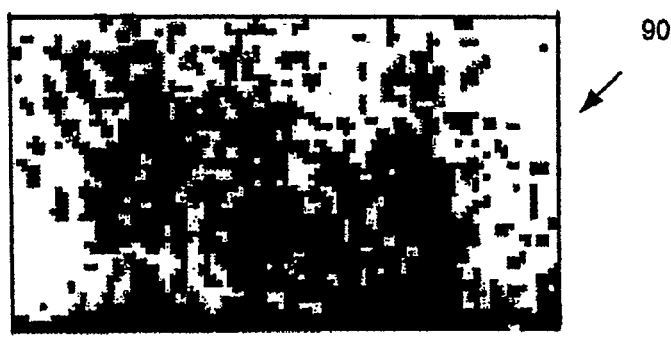
FIG. 9 is a portion of the image in FIG. 8 illustrating an example of white pixel noise.
Figure 10:
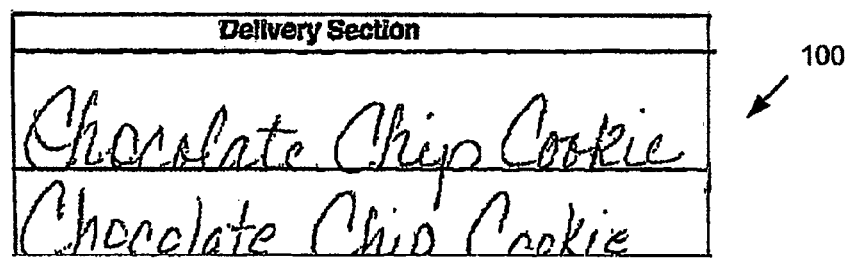
FIG. 10 is an image that illustrates an acceptable amount of white pixel noise.

An image can also be evaluated for white pixel noise by determining the number of small white particles in the image. Each white particle comprises contiguous white pixels. A large number of small white pixel particles can indicate aberrations in the image background, which is typically depicted in the image as white. FIG. 8 shows an example of an unacceptable image 80 due to white pixel noise. FIG. 9 illustrates white pixel noise in an image 90 where the image is shown in a magnified view. In contrast to the image shown in FIG. 8, FIG. 10 illustrates an image 100 that has an acceptable level of white pixel noise. In some embodiments, the threshold value for the number of white pixel particles is between about 100 and about 250, more preferably between about 150 and about 200, and typically at about 175.

Figure 11:
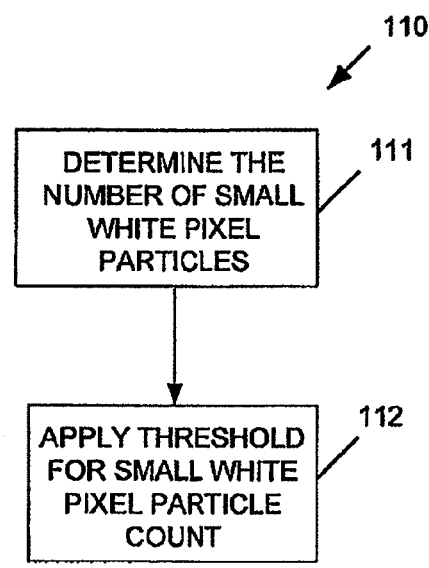
FIG. 11 is a flowchart illustrating a process for determining images with unacceptable or acceptable amounts of white pixel noise.

FIG. 11 is a flowchart illustrating a process 110 for determining whether an image is unacceptable or acceptable based on the amount of white pixel noise in the image. At step 111, process 110 analyzes the image to determine the number of (small) white particles (the particle count), where the number of contiguous white pixels in each particle are less than a certain threshold value, for example, about 20 pixels. At step 112, process 110 compares particle count to a predetermined threshold value. In some embodiments the threshold value is about 175. If the particle count is greater than the corresponding threshold value, process 110 rejects the image; if less than the threshold value process 110 accepts the image.

Too Few Black Pixels

Figure 12:
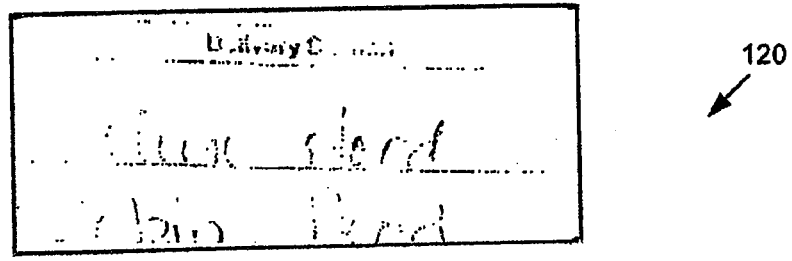
FIG. 12 is an illustration of an unacceptable "blank" image.
Figure 13:
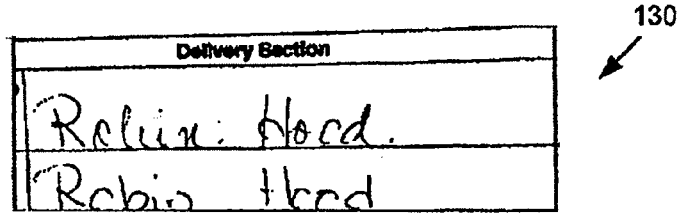
FIG. 13 is an illustration of an acceptable "non-blank" image, according to some embodiments.
Figure 14:
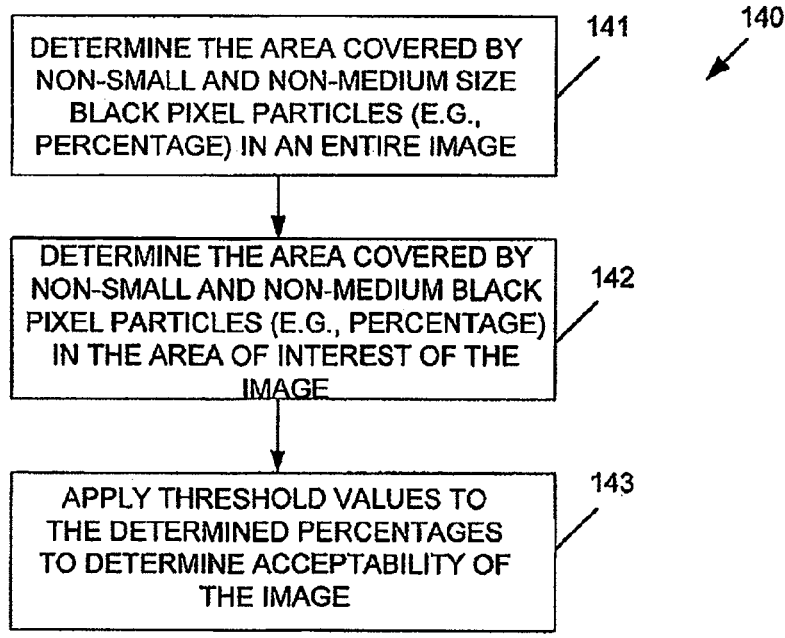
FIG. 14 is a flowchart illustrating a process for determining unacceptable "blank" images.
Figure 15:
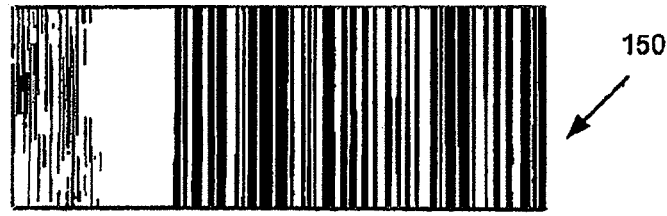
FIG. 15 is an image that illustrates an example of incorrect subject matter in a confirmation signature image which results in a large count of black pixels.
Figure 16:
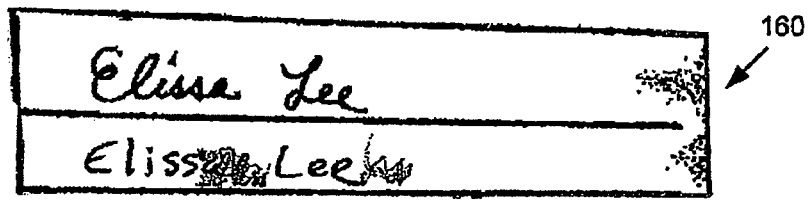
FIG. 16 is an illustration of an image that has an acceptable black pixel count.

To be useful, the confirmation signature must be legible. Accordingly, a confirmation signature image that is blank (or nearly so) cannot be used to verify who the signor is, and is therefore unacceptable. FIG. 12 illustrates an unacceptable image 120, which is deemed a "blank" image due to the nearly nonexistent signature. To be acceptable, the signature should be visible against the background, as shown in the acceptable image 130 in FIG. 13. FIG. 14 illustrates a flowchart of a process 140 that can be used to determine whether a signature confirmation image is an unacceptable "blank" image. To identify "blank" images, the images are analyzed to determine the area covered by non-small and non-medium size black pixel particles in the entire image and in the area of interest (for example, the signature and printed name area of the image). At step 141, the process 140 determines the total area coverage of non-small and non-medium size black pixel particles in the entire image. At step 142, process 140 determines the area covered by non-small and non-medium size black pixel particles in the area of interest. At step 143, predetermined threshold values are compared to the determined values in steps 141 and 142.

In one example, if the black pixel area coverage in the entire image as determined by step 141 is less than about 7%, or the black pixel area coverage in the area of interest is less than about 5.3%, the image is deemed unacceptable. In other embodiments, the threshold value for the black pixel coverage by non-small and non-medium black pixel particles in the entire image area is set to between about 6% and about 10%, and set for the area of interest to between about 5% and about 9%. The threshold value for the area of interest is preferably set below the threshold value for the entire image.

High Number of Black Pixels

Having a large number of black pixels in an image can indicate that the image is unacceptable for signature confirmation. This condition may occur if there is too much noise in an image or if the images are dark or dimly lit. Images that do not correctly depict the area of interest (which typically has a light background), instead showing a different portion of the delivery receipt or package which may have a darker background, may also have a large number of black pixels. For example, an image 150, illustrated in FIG. 15, incorrectly depicts a barcode instead of a confirmation signature area. The barcode image 150 includes a large number of black pixels, where an acceptable image 160 (FIG. 16) of the confirmation signature image may not.

Figure 17:
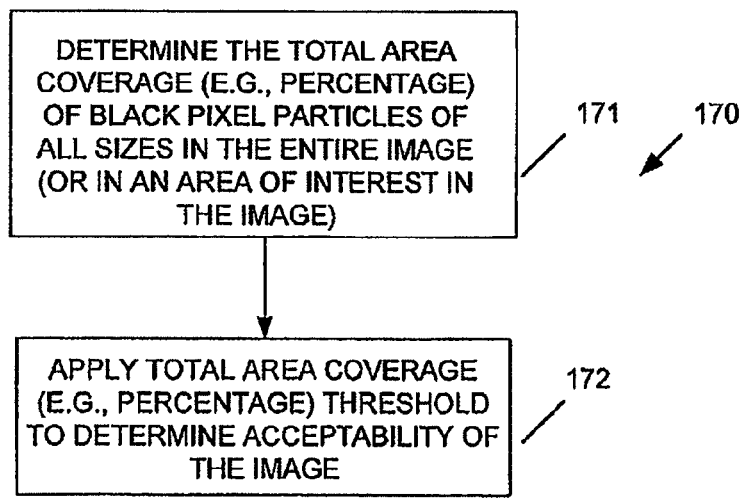
FIG. 17 is a flowchart illustrating a process for determining whether an image has a high number of black pixels.
Figure 18:
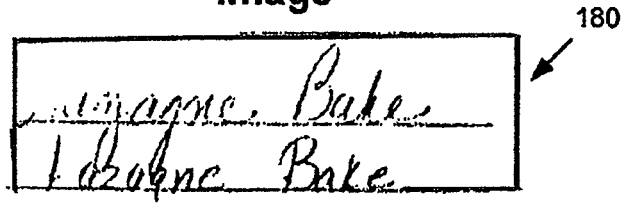
FIG. 18 is an illustration of an unacceptable image produced by an Intelligent Mail Device ("IMD") imager.

FIG. 17 illustrates a process 170 for determining if an image is unacceptable due to having a large number of black pixels. This determination can be made for the entire image, or for a selected portion of the image. At step 171, process 170 analyzes the entire image to determine the number of pixels in all the black particles in the image regardless of the size of the particles, (e.g., all of the black pixels in the image) and then determines the percentage of the area of the image covered by the black pixels. In some embodiments, the coverage of black pixels can be made for an area of interest in the image. At step 172, process 170 compares a predetermined threshold value (for example, a percentage value) to the calculated percentage of black pixel coverage. If black pixels cover a higher percentage of the image (or the selected area of interest) than the threshold value, the image is deemed unacceptable. In some embodiments, the threshold value is between about 20% and about 40%, and in some preferable embodiments about 35%.

Test Image/Control Image Comparison

In some embodiments, images that are generated using two different systems can be compared to determine performance information of the two systems. For example, a test image can be generated using a software or hardware upgrade to determine if it is actually an improvement to the existing (or previous) version. For proper evaluation, numerous images can be compared. Automating the image comparison allows hundreds or even thousands of images to be evaluated, saving numerous man-hours, making the results more statistically significant, and increasing the objectivity of the evaluation.

Figure 19:
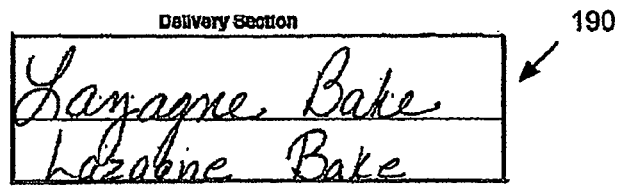
FIG. 19 is an illustration of a control image produced using a flatbed scanner.

In one embodiment, one or more images generated from an IMD (for example, image 180 of FIG. 18) are compared to one or more images generated using a flat-bed scanner (for example, image 190 of FIG. 19). In this case, the IMD image 180 is considered the test image and the flat-bed image 190 is considered the control image (and is expected to be a higher quality).

Figure 20:
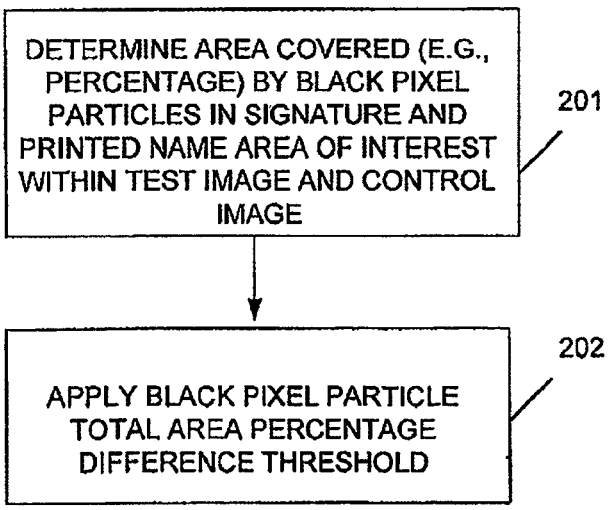
FIG. 20 is a flowchart illustrating a process for determining whether the quality of a test image is similar to the quality of a control image.

FIG. 20 illustrates a process 200 which compares a test image and a control image. At step 201 the process 200 determines the area covered by black pixels in medium to large-sized black pixel particles that are greater in size than a threshold value, in the signature and printed name area of the test image and the control image. In some embodiments, the threshold value is about 20 pixels. In some embodiments, the associated test image and the control image depict the same signature and printed name to obviate differences caused by different signatures or printed names.

Figure 21:
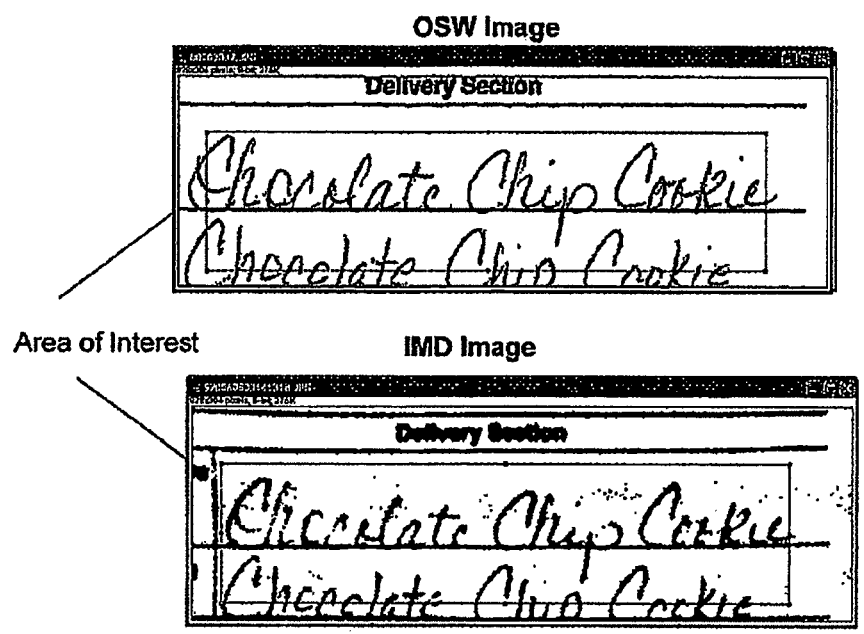
FIG. 21 illustrates the signature and printed name area of interest on a test image and a control image.

FIG. 21 illustrates an example of an area of interest that can be evaluated and used to compare the two images. Referring again to FIG. 20, at step 202, the process 200 compares the black pixel area covered in the test image and the control image. The control image can be assumed to be better due to the conditions in which the image was formed. In this example, the test image is considered unacceptable if the black pixel area coverage difference is less than a threshold value, for example 15%, as this indicates there are too many differences between the test image and the control image.

A similar process can be also used to test a new hardware or software configuration of the imaging device. Here, the control images are images made from the current (older) configuration and the test images are images made with the new configuration. One or more of the criteria described herein can be used, singly or in combination, to determine if the test images have a higher objective quality over the control images by exhibiting less black noise, white noise, blank images, black pixel area coverage, large black particles and/or small-to-medium sized black particles.

Large Black Particle Aberrations

Figure 22:
FIG. 22 is an illustration of an unacceptable image due to at least one large black particle.
Figure 23:
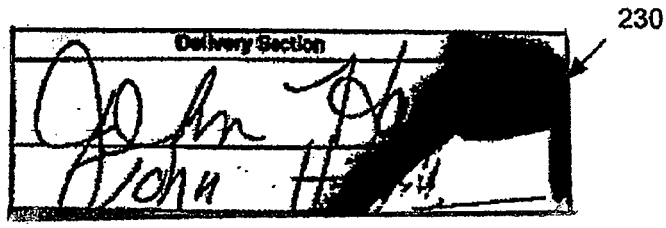
FIG. 23 is an illustration of an acceptable image based on certain threshold limitations.

The presence of a large black particle in the image, such as the black defect shown in the image 220 in FIG. 22, can also indicate that an image is unacceptable for signature confirmation. However, some images that have a black particle defect may be acceptable because a sufficient portion of the area of interest is legible, as illustrated in image 230 of FIG. 23.

Figure 24:
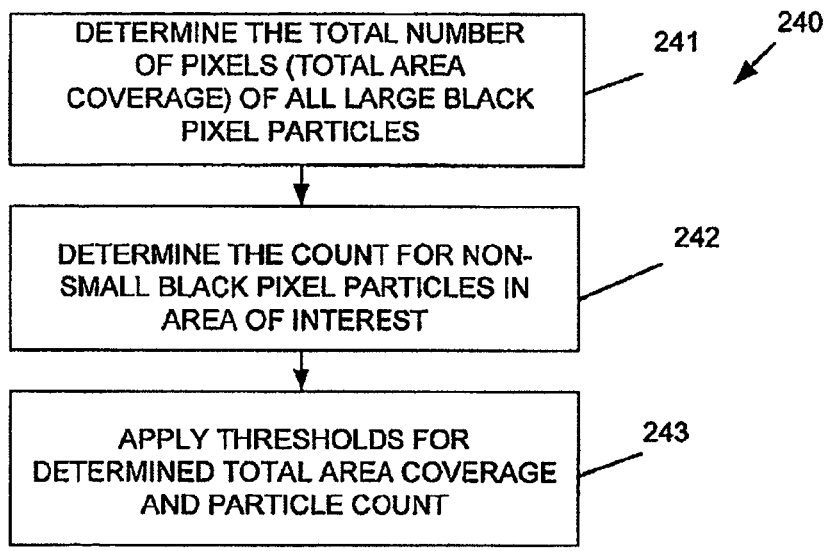
FIG. 24 is a flowchart illustrating a process for determining whether an image is unacceptable due to the presence of at least one large black particle.

FIG. 24 is a flowchart illustrating a process 240 that can determine whether an image is unacceptable due to the presence of at least one large black particle, or if it is truncated due to an imaging or processing error. At step 241, process 240 determines the number of large black particles in the image and also determines the area covered by the large pixels. The threshold value for defining the minimum size of a large particle can be about 200 pixels or larger, including between about 10,000 pixels to about 50,000 pixels or larger. In some embodiments, the size of a large particle is at least about 20,000 pixels, and preferably at least about 30,000 pixels. At step 242 the process 240 determines the number of non-small particles in the area of interest of the image. Typically, the area of interest is the signature confirmation area of the image. Non-small particles include medium-sized particles and large particles. At step 243, the process 240 compares the total large black particle pixel coverage area to a threshold (for example, about 45,000). The process 240 also compares the large black particle count in the area of interest to another threshold (for example, about 15). In this example, if the non-small black pixel coverage area of interest exceeds 45,000 pixels and the particle count in the signature area exceeds 15 the image is deemed unacceptable.

Medium Black Particles

Figure 25:
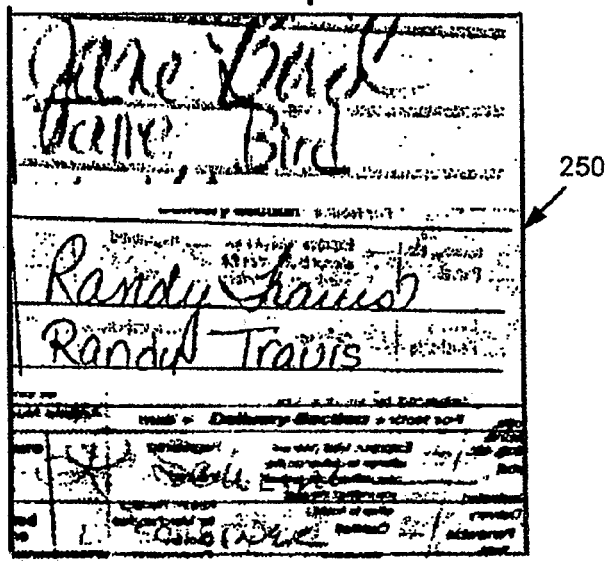
FIG. 25 is an illustration of an unacceptable image due to the presence of small to medium sized black pixel particles above a certain threshold.
Figure 26:
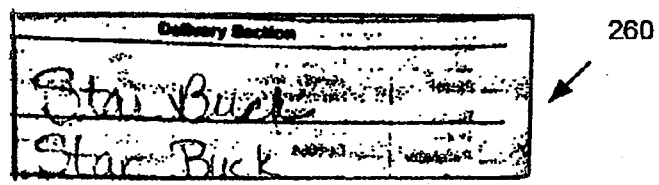
FIG. 26 is an illustration of an acceptable image that does not contain small to medium sized black pixel particles above a certain threshold.

The presence of medium-size black pixel particles can also indicate that an signature confirmation image is unacceptable. FIG. 25 illustrates three examples of signature portions of signature confirmation images, each being unacceptable due to the presence of medium-sized black particles. FIG. 26 illustrates acceptable signature confirmation images that include some medium-sized black pixel particles but not enough to reject the image.

Figure 27:
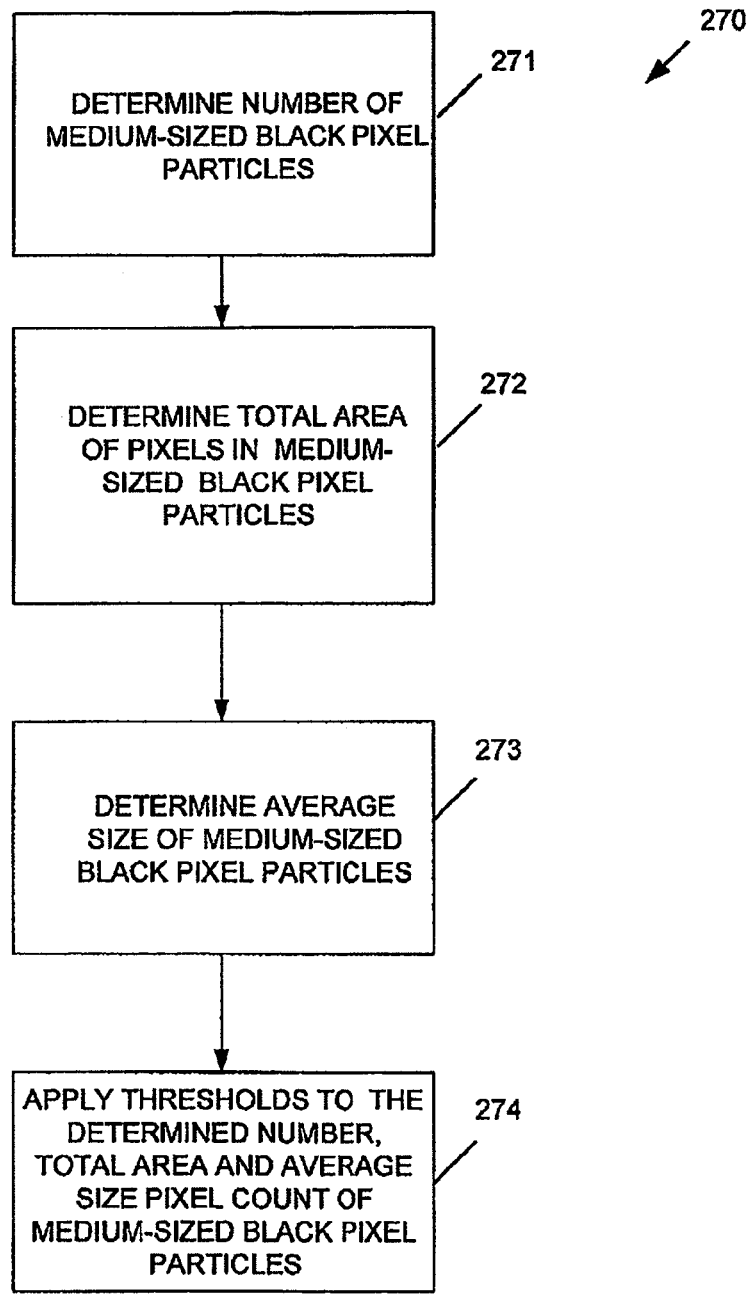
FIG. 27 is a flowchart illustrating a process for determining whether an image is unacceptable due to certain thresholds for small to medium-sized black particles.

FIG. 27 is a flowchart illustrating a process 270 for determining whether an image is unacceptable due to the presence of medium-sized black particles as determined by certain objective criteria and predetermined thresholds. The criteria used for process 270 targets images with poor clarity, significantly blurred images, and images having significant bleed-though to be identified as unacceptable images. At step 271, process 270 determines the number of medium-sized black pixel particles in the entire image. At step 272, process 270 determines the total area covered by all the medium-sized black particles. At step 273, process 270 determines the average pixel count of the medium black pixel particles. Then at step 274, the process compares the number of medium-sized black particles, the black pixel particle coverage area and average pixel area per particle to predetermine threshold values.

The development is not meant to be limited by the exemplary embodiments described herein for delivered packages of any kind. Rather, similar embodiments can be used for remote authorization for any good or service that requires a signature. For example, rental return services such as car rentals, equipment rentals, or rentals at the beach. Embodiments can be used for door-to-door sales or services, including for goods that will be delivered subsequently or services that may be performed at a later time. Other applications of the development include instances where a signature is used for identify verification including at remote locations or events.

The methods described here can be implemented using one or more computers configured to execute one or more computer program embodying the desired method. The computer programs can be provided as computer program products comprising a computer useable medium having computer program logic recorded thereon, which when executed by a computer processor configured to execute the same, performs an authentication method according to the invention. The computer program logic can comprise computer program code logic configured to perform a series of operations required to implement the particular embodiment desired. Computer usable medium refers to any medium or device that can be used to provide software or program instructions to a computer or computer system, and includes media such as removable data storage devices. The computer usable medium also includes a machine readable medium comprising instructions for performing an image evaluation method according to the invention that upon execution causes a machine to execute the image evaluation method. In one embodiment, the program can be implemented on a hand-held imaging device, for example, an IMD. As those in the art will appreciate, the embodiments, features, and functionality of the development as described are not dependent on particular computer system or processor architecture or on a particular operating system. The development can also be implemented using other computer or processor systems and/or architectures.

Computer programs or computer control logic can be stored in a memory in communication with the processor(s) intended to execute the program or can be received via any suitable communications interface. Computer programs executed according to the invention can enable the computer system to perform the desired functions. In embodiments where the methods of the development are implemented using software, the software can be stored in, or transmitted via, a computer program product and loaded into a computer system using any suitable approach, including a removable storage device, hard drive, or communications interface. When the control logic or software is executed by the processor(s), the processor(s) are caused to perform the functions of the invention. In other embodiments, the invention is implemented primarily in hardware using, for example, hardware components such as PALs, application specific integrated circuits (ASICs), or other hardware components.

The development illustratively described herein suitably may be practiced in the absence of any element(s) not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the development has been specifically disclosed by certain embodiments and optional features, modification and variation of the concepts herein disclosed may be resorted to by those skilled in the art, and that such modifications and variations are considered to be within the scope of this invention as defined by the appended claims.

What is claimed is:

1. A method of evaluating two bi-chrome digital images generated by an imaging device, the method comprising:
generating a first image, the first image having pixels of a first color and a second color;
identifying, using a processor, a particle comprising contiguous pixels of the first color in the first image;
determining, using a processor, first information relating to particle size and particle location of particles of the first color contained in the first image;
generating a second image, the second image having pixels of the first color and the second color;
identifying, using a processor, a particle comprising contiguous pixels of the first color in the second image;
determining, using a processor, second information relating to particle size and particle location of particles of the first color contained in the second image;
developing, using a processor and the first information, a first value corresponding to the area of the first image covered by particles of the first color;
developing, using a processor and the second information, a second value corresponding to the area of the second image covered by particles of the first color; and
determining, using a processor, if the second image is acceptable based on a predetermined objective criteria and the first and second values.

2. The method of claim 1, wherein the first color is black, and the second color is white.

3. The method of claim 1, wherein identifying a particle comprising contiguous pixels of the first color comprises identifying particles having a size equal to or greater than a threshold value.

4. The method of claim 3, wherein the threshold value is about 20 pixels.

5. The method of claim 1, wherein the first and second images are images of the same signature and printed name.

6. The method of claim 5, wherein the first image and second image are generated by different imaging apparatuses.

7. The method of claim 6, wherein the first image is generated by a flat-bed scanner, and the second image is generated by a hand-held imaging device.

8. The method of claim 1, wherein determining if the second image is acceptable comprises comparing the first and second values to a predetermined threshold value.

9. The method of claim 8, wherein the predetermined threshold value comprises about 15%.

10. The method of claim 8, wherein the second image is determined to be acceptable if the first value and second value differ by less than the predetermined threshold value.

11. The method of claim 1 further comprising:
identifying, using a processor, a particle comprising contiguous pixels of the second color in the first image;
determining, using a processor, third information relating to particle size and particle location of particles of the second color contained in the first image;
identifying, using a processor, a particle comprising contiguous pixels of the second color in the second image;
determining, using a processor, fourth information relating to particle size and particle location of particles of the second color contained in the second image;
developing, using a processor and the third information, a third value corresponding to the area of the first image covered by particles of the second color;
developing, using a processor and the fourth information, a fourth value corresponding to the area of the second image covered by particles of the second color; and
determining, using a processor, if the second image is acceptable based on a predetermined objective criteria and the third and fourth values.

12. A non-transitory machine readable medium comprising instructions for evaluating two bi-chrome digital images, wherein the instructions cause a machine to:
- generate a first image, the first image having pixels of a first color and a second color;
- identify a particle comprising contiguous pixels of the first color in the first image;
- determine first information relating to particle size and particle location of particles of the first color contained in the first image;
- generate a second image, the second image having pixels of the first color and the second color;
- identify a particle comprising contiguous pixels of the first color in the second image;
- determine second information relating to particle size and particle location of particles of the first color contained in the second image;
- develop, using the first information, a first value corresponding to the area of the first image covered by particles of the first color;
- develop, using the second information, a second value corresponding to the area of the second image covered by particles of the first color; and
- determine if the second image is acceptable based on a predetermined objective criteria and the first and second values.

13. The non-transitory machine readable medium of claim 12, wherein the first color is black, and the second color is white.

14. The non-transitory machine readable medium of claim 12, wherein the instructions causing the machine to identify a particle comprising contiguous pixels of the first color further comprise instructions causing a machine to identify particles having a size equal to or greater than a threshold value.

15. The non-transitory machine readable medium of claim 14, wherein the threshold value is about 20 pixels.

16. The non-transitory machine readable medium of claim 12, wherein the instructions causing the machine to determine if the second image is acceptable further comprise instructions causing a machine to compare the first and second value to a predetermined threshold value.

17. The non-transitory machine readable medium of claim 16, wherein the predetermined threshold value comprises about 15%.

18. The non-transitory machine readable medium of claim 16, wherein the second image is determined to be acceptable if the first value and second value differ by less than the predetermined threshold value.

19. The non-transitory machine readable medium of claim 12, wherein the first and second images are images of the same signature and printed name.

20. The non-transitory machine readable medium of claim 19, wherein the first image and second image are generated by different imaging apparatuses.

21. The non-transitory machine readable medium of claim 20, wherein the first image is generated by a flat-bed scanner, and the second image is generated by a hand-held imaging device.

22. The non-transitory machine readable medium of claim 12, wherein the instructions, upon execution, further cause the machine to:
- identify a particle comprising contiguous pixels of the second color in the first image;
- determine third information relating to particle size and particle location of particles of the second color contained in the first image;
- identify a particle comprising contiguous pixels of the second color in the second image;
- determine fourth information relating to particle size and particle location of particles of the second color contained in the second image;
- develop, using the third information, a third value corresponding to the area of the first image covered by particles of the second color;
- develop, using the fourth information, a fourth value corresponding to the area of the second image covered by particles of the second color; and
- determine if the second image is acceptable based on a predetermined objective criteria and the third and fourth values.

23. A system for evaluating two bi-chrome digital images generated by an imaging device, the method comprising:
- means for generating a first image, the first image having pixels of a first color and a second color;
- means for identifying a particle comprising contiguous pixels of the first color in the first image;
- means for determining first information relating to particle size and particle location of particles of the first color contained in the first image;
- means for generating a second image, the second image having pixels of the first color and the second color;
- means for identifying a particle comprising contiguous pixels of the first color in the second image;
- means for determining second information relating to particle size and particle location of particles of the first color contained in the second image;
- means for developing a first value corresponding to the area of the first image covered by particles of the first color;
- means for developing a second value corresponding to the area of the second image covered by particles of the first color; and
- means for determining if the second image is acceptable based on a predetermined objective criteria and the first and second values.

* * * * *